(12) United States Patent
Suihko et al.

(10) Patent No.: US 9,263,063 B2
(45) Date of Patent: Feb. 16, 2016

(54) SWITCHING OFF DTX FOR MUSIC

(75) Inventors: Timo Suihko, Espoo (FI); Johan Gunnar Lundström, Pargas (FI); Arto Mahkonen, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 412 days.

(21) Appl. No.: 13/578,695

(22) PCT Filed: Feb. 25, 2010

(86) PCT No.: PCT/EP2010/052427
§ 371 (c)(1),
(2), (4) Date: Nov. 26, 2012

(87) PCT Pub. No.: WO2011/103924
PCT Pub. Date: Sep. 1, 2011

(65) Prior Publication Data
US 2013/0138433 A1    May 30, 2013

(51) Int. Cl.
*G10L 25/93* (2013.01)
*G10L 19/012* (2013.01)
*H04W 76/04* (2009.01)
*G10L 19/22* (2013.01)
*G10L 25/78* (2013.01)

(52) U.S. Cl.
CPC ............... *G10L 25/93* (2013.01); *G10L 19/012* (2013.01); *H04W 76/048* (2013.01); *G10L 19/22* (2013.01); *G10L 25/78* (2013.01)

(58) Field of Classification Search
USPC ......................................................... 704/208
See application file for complete search history.

(56) References Cited

U.S. PATENT DOCUMENTS

| | | | |
|---|---|---|---|
| 5,737,695 A | 4/1998 | Lagerqvist et al. | |
| 5,870,397 A * | 2/1999 | Chauffour et al. | 370/435 |
| 6,633,841 B1 | 10/2003 | Thyssen et al. | |
| 7,130,795 B2 * | 10/2006 | Gao | 704/216 |
| 7,856,354 B2 * | 12/2010 | Yonekubo et al. | 704/226 |
| 8,990,073 B2 * | 3/2015 | Malenovsky et al. | 704/208 |
| 2004/0128126 A1 * | 7/2004 | Nam et al. | 704/225 |
| 2006/0171419 A1 * | 8/2006 | Spindola et al. | 370/477 |
| 2008/0008298 A1 * | 1/2008 | Kirla | 379/88.03 |
| 2008/0195383 A1 | 8/2008 | Shlomot et al. | |
| 2013/0190037 A1 * | 7/2013 | Hellwig et al. | 455/550.1 |

* cited by examiner

*Primary Examiner* — Abul Azad
(74) *Attorney, Agent, or Firm* — Coats & Bennett, P.L.L.C.

(57) ABSTRACT

The invention relates to a method for disabling a discontinuous transmission node DTX of a speech encoder if a music signal is detected in a call input signal. The music signal is detected by determining an activity factor corresponding to the relation of sound signal periods relative to scheme signal periods. If the activity factor is higher than a specified activity factor, the DTX is disabled.

22 Claims, 4 Drawing Sheets

SWITCHING OFF DTX FOR MUSIC

TECHNICAL FIELD

This invention relates to a method for controlling a discontinuous transmission mode DTX of a speech encoder and to a method for controlling the discontinuous transmission mode of a speech encoder encoding a call input signal and outputting an encoded call output signal.

BACKGROUND

In most applications of mobile communication voice is still the most important media component. All speech encoders and the mechanisms around the speech encoders are optimized for voice. Music was not considered important in the design of the mobile communication components.

Recently, music has become more important in applications, e.g. in "Music-on-Hold" or "Music-ring-back-Tones".

In order to save radio and network link capacity, a voice activity detector (VAD) was developed for the discrimination between speech and pause. If a pause was detected, no signals were transmitted from the silent parts to the other party. Later it turned out that it is very unpleasant for the user when the loudspeaker is totally silent between talk snatches of the other partner. As a consequence, comfort noise was invented in which the terminal receiving the speech signal creates the comfort noise on its own just on the basis of a few silence descriptor (SID) parameters transmitted every now and then.

This operation is called discontinuous transmission (DTX) controlled by the voice activity detector within the speech codec. However, the VAD is not working well for music signals. Often, music signals are falsely classified as background noise and are replaced by comfort noise.

One solution would be to turn on or off VAD/DTX in the downlink direction, either for the entire duration of the call or just during the alerting phase. However, disabling VAD/DTX for all calls in a network will lead to increased radio interference.

Enabling downlink VAD/DTX makes it possible for the operator to optimize radio planning (e.g. fewer radio base stations may be needed) and it is therefore advantageous to use DTX in the downlink direction. For an optimized radio capacity and for correctly recognizing music signals in a call, the best solution would be to disable VAD/DTX only when music is played towards the mobile terminal.

SUMMARY

Accordingly, a need exists to provide a solution allowing to optimize the radio capacity while avoiding that music signals are falsely qualified as background noise.

This need is met by the features of the independent claims. In the dependent claims preferred embodiments of the invention are described.

According to a first aspect of the invention a system for controlling a DTX mode of a speech encoder is provided, the system comprising a speech encoder encoding a call input signal and outputting an encoded call output signal. Furthermore, an activity detector is provided determining a presence of a sound signal period in the call input signal relative to the presence of silence signal periods in the call input signal. A discontinuous transmission enabling and disabling unit determines an activity factor based on the sound and silence signal periods in the call input signal and enables and disables the discontinuous transmission mode of the encoded call output signal. The discontinuous transmission enabling and disabling unit disables the discontinuous transmission mode if the determined activity factor is higher than a specified activity factor $AF_s$. With the presently claimed system it is possible to disable DTX only when music is played towards the mobile terminal. It is possible to differentiate between music and speech, as the relation between speech and silence frames or music and silence frames is such that in the case of music the percentage of silence frames is much smaller for music than for speech. The activity factor representing the amount of sound signal periods and silence signal periods reflects the presence of music in a call and can thus be used to differentiate music from scheme signal periods.

Preferably, the discontinuous transmission enabling and disabling unit is configured to determine the activity factor by determining the relation of speech and music signal samples relative to silence signal samples in the call input signal. By way of example if the determined activity factor by the discontinuous transmission enabling and disabling unit is higher than about 75-85% or higher than 78-82% or higher than 80%, the discontinuous transmission mode DTX may be disabled, as the likelihood that the call input signal contains music is very high. It was found that music typically results in an activity factor of at least 90%, while speech usually has an activity factor of less than 60%. The setting of the specified activity factor $AF_s$ between 70% and around 85% helps to discriminate speech from music. As a consequence, if the determined activity factor is higher than the specified activity factor, e.g. around 80%, DTX may be disabled.

In one embodiment of the invention the discontinuous transmission enabling and disabling unit uses an information of a voice activity detector configured to distinguish speech from speech pauses for determining the activity factor.

In another embodiment the activity detector determines a value of a voice activity flag, the voice activity flag having a first value if a time interval in the call input signal is considered to be a sound signal period. The voice activity flag has a second value if the time interval of the call input is considered to be a silence signal period. The discontinuous transmission enabling and disabling unit determines as the activity factor the percentage of time intervals in a sliding time window containing a plurality of time intervals of the call input signal having the first value. Thus, the discontinuous transmission enabling and disabling unit determines the activity factor if the time intervals in the sliding time windows, e.g. 100-200 samples of time intervals, have the first or the second value. If more than approximately 80% of the samples of the most recent intervals in the time window have the first value, the signal can be considered as a music signal. If only 40-50% or 60% of the most recent samples in the sliding time window have the first value, then the call input signal can be considered as a speech signal.

Preferably, the discontinuous transmission enabling and disabling unit enables again the DTX mode if the detected activity factor is lower than the specified activity factor. If the activity factor is lower than the above-discussed threshold, it can be concluded that no music signal is present anymore in the call, so that the DTX mode should be enabled again.

The value of the voice activity flag may be determined by determining the signal power sample over the time interval of the call input signal. The activity detector compares the determined signal power to a power threshold $P_{th}$, and when the signal power is higher than the threshold $P_{th}$, the activity detector assigns the first value to said time interval and considers said time interval of the call input signal to be a sound signal period.

The invention furthermore relates to a method for controlling a discontinuous transmission mode DTX of the speech encoder comprising the step of determining a presence of sound signal components in the call input signal relative to the presence of the silence signal components in the call input signal. Furthermore, an activity factor is determined in dependence on the amount of sound and silence signal components in the call input signal. The discontinuous transmission mode for the encoded call output signal is then enabled or disabled in dependence on the determined activity factor, wherein, if the determined activity factor is higher than a specified activity factor $AF_s$, the discontinuous transmission mode DTX is disabled.

As discussed above, the determination of the activity factor preferably comprises the step of determining the relation of speech and music signal samples relative to silence signal samples in the call input signal.

In one embodiment of the invention the step of determining the activity factor comprises the step of monitoring a voice activity detector configured to distinguish speech from speech pauses. The discontinuous transmission mode DTX can then be disabled when the speech pauses determined by the voice activity detector are below a certain threshold. In another embodiment the activity factor is determined by determining the value of the voice activity flag as mentioned above. If the signal power of the time interval is higher than a power threshold $P_{th}$, the first value is assigned to said time interval and the time interval is considered to be a sound signal period. If, however, the determined signal power is lower than said threshold, the second value may be assigned to said time interval and the time interval is considered to be a silence signal period. The amount of sound and silence signal periods in the sliding time window then determines the activity factor.

Preferably, the specified activity factor $AF_s$ is an activity factor range with an upper threshold and a lower threshold. If the activity factor is higher than the upper threshold, the discontinuous transmission mode DTX may be disabled, and if the activity factor is lower than the lower threshold, the discontinuous transmission mode DTX may be enabled. Preferably, the upper and lower thresholds can be configured as adaptive thresholds. In this embodiment the upper and the lower thresholds are incremented when the activity factor is lower than the lower threshold and the upper and the lower thresholds are decremented if the activity factor is higher than the upper threshold. This helps to avoid that DTX is frequently disabled or enabled again.

BRIEF DESCRIPTION OF THE DRAWINGS

The invention will be described in further detail with reference to the accompanying drawings, in which.

DETAILED DESCRIPTION

Figure 1:
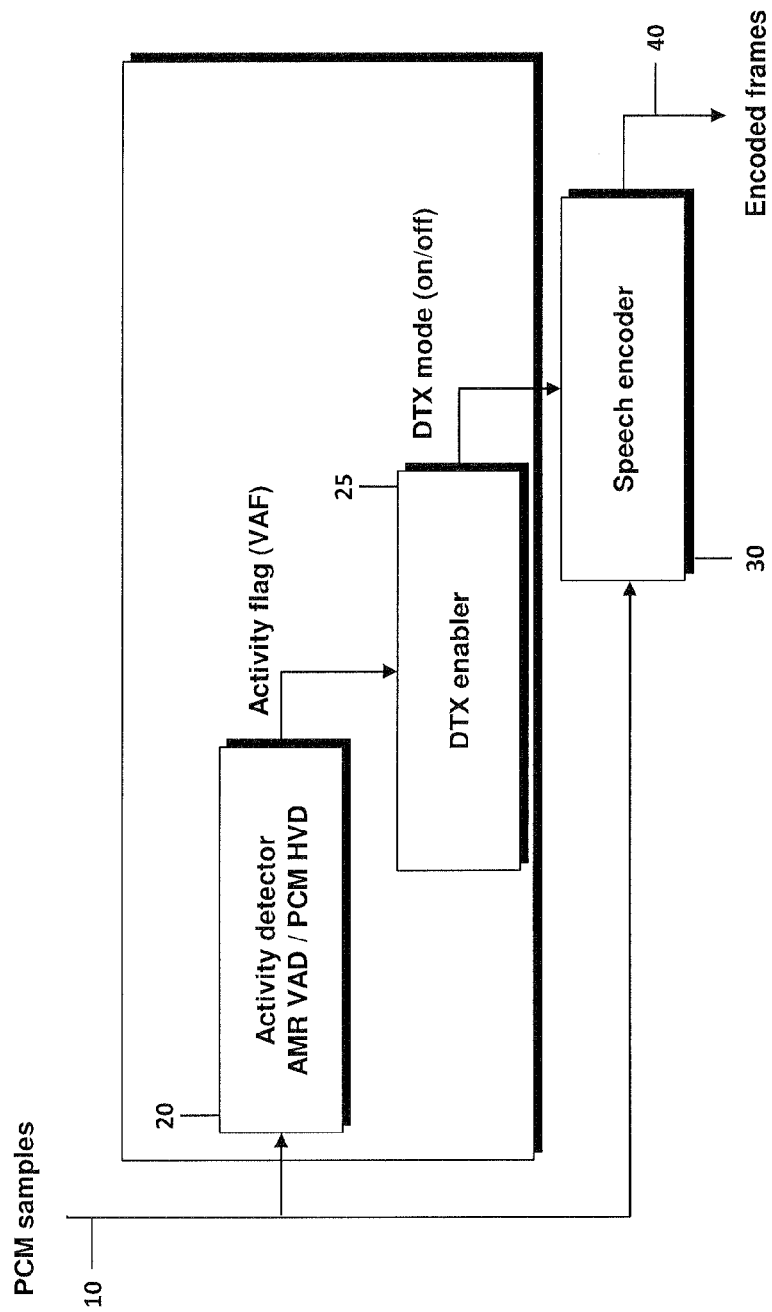
FIG. 1 shows a system allowing to disable a DTX mode in the case of a music signal.

In FIG. 1 a system is shown allowing to discriminate music from other speech signals in a call. A call input signal 10 is transmitted to an activity detector. The call input signal may contain the same linear 16-bit PCM samples that are also used as the input to a speech encoder 30. The call input signal 10 is transmitted to an activity detector 20 that determines whether the frame of input samples is a sound signal period or a silence signal period. The voice activity detector determines a Boolean voice activity flag VAF, that may have the first value or that is true for a frame that is considered to be part of an active voice (speech or music) or false (second value) if the frame is considered to be part of a silence period. The voice activity detector 20 can be a standard voice activity detector or the voice activity detector can be a PCM high voice detector that is analyzing the signal power during time periods, such as 20 ms, and which then decides whether the signal power of the period represents high voice (VAF=1) or low voice (VAF=0). Thus, the activity detector 20 determines the value of the voice activity flag by comparing the signal power to a threshold.

Figure 2:
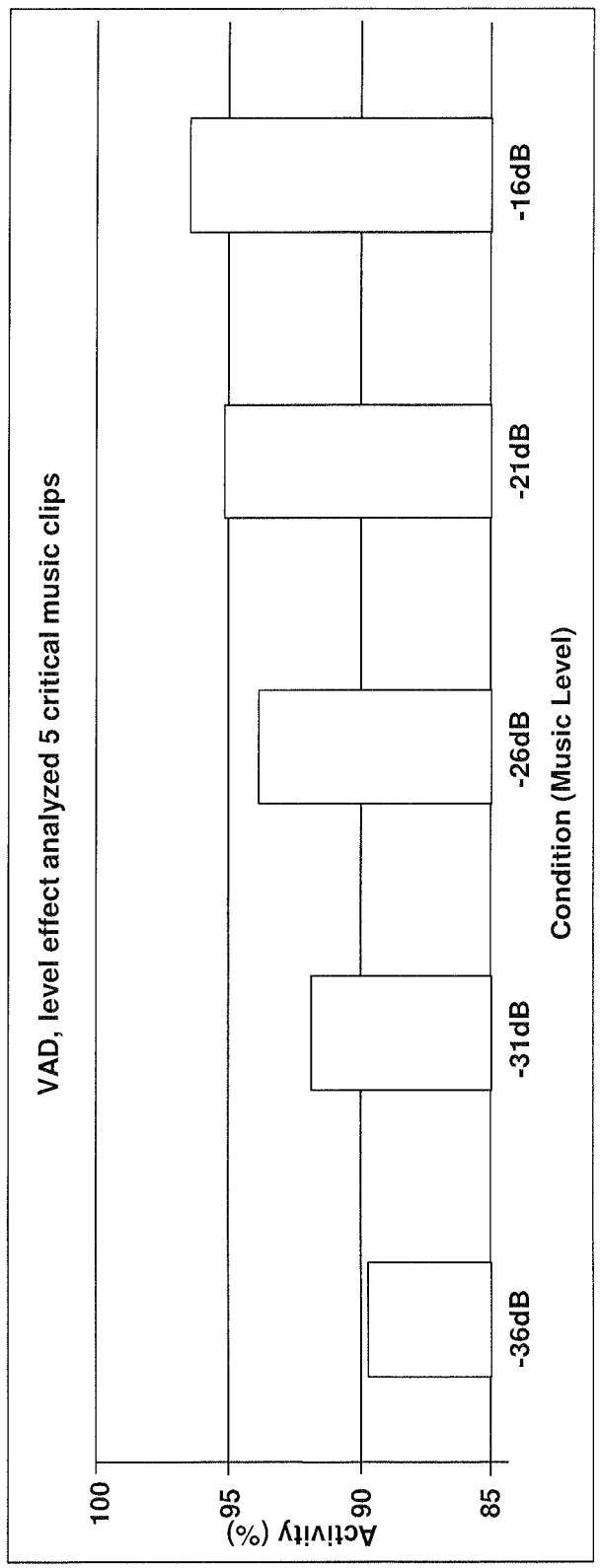
FIG. 2 shows activity factors for different music inputs.

In another embodiment the activity detector is an AMR voice activity detector. The AMR voice activity detector may be extracted from the AMR NB speech encoder and may be executed as a separate function unit 20 or inside a DTX enabling or disabling unit 25. DTX enabling or disabling unit 25 disables or enables the DTX mode in speech encoder 30 that outputs the encoded speech signal 40. As can be seen in FIG. 2, if a music signal is present in the call input signal, the determined voice activity factor is higher than 85% for different types of music. The DTX enabling/disabling unit 25 actually decides whether DTX is enabled or disabled for the speech encoder. This can be done in the DTX enabling or disabling unit on monitoring the behaviour of the VAF samples over a longer sliding time window of a couple of seconds, e.g. two, three or four seconds. The DTX enabling or disabling unit 25 determines the activity factor, as the percentage of VAF samples that have the first value (1) during the most recent 100, 150 or 200 VAF samples, with the VAF sampling period being around 20 ms.

In order to allow undistorted music during the alerting phase of a call, DTX may be switched off by default. If the activity measurement in the activity detector 20 during the first, e.g. three seconds, of a call result in a determined activity factor by the DTX enabling or disabling unit 25 of less than around 80%, the DTX may be switched on to minimize radio interference for the rest of the alerting phase.

During the active phase of the call DTX would be by default switched on. The DTX enabling or disabling unit however continuously determines the activity factor, and if the activity factor is higher than e.g. 80% during the sliding time window, DTX would be switched off. The determination of the activity factor would continue and if the result is lower than the specified threshold, DTX would be switched on again.

The activity factor can be determined based on the VAD results in the sliding time window as discussed above or the activity factor may be determined by calculation using the number of sent speech/music and silence frames in the downlink direction towards the user terminal. By way of example in the case of AMR codec speech/music frames are sent every 20 ms, whereas silence frames are sent every 160 ms. If the determined activity factor is higher than around 80%, it is a clear indication that a music type of input signal is currently played. Even if it was not a music input signal it would not harm to switch off DTX, as there would be no big difference from the sent speech frames point of view.

As can be seen from the embodiment of FIG. 1, the proposed solution is independent from the speech encoder used and does not necessarily have to be embedded into the speech encoder.

Figure 3:
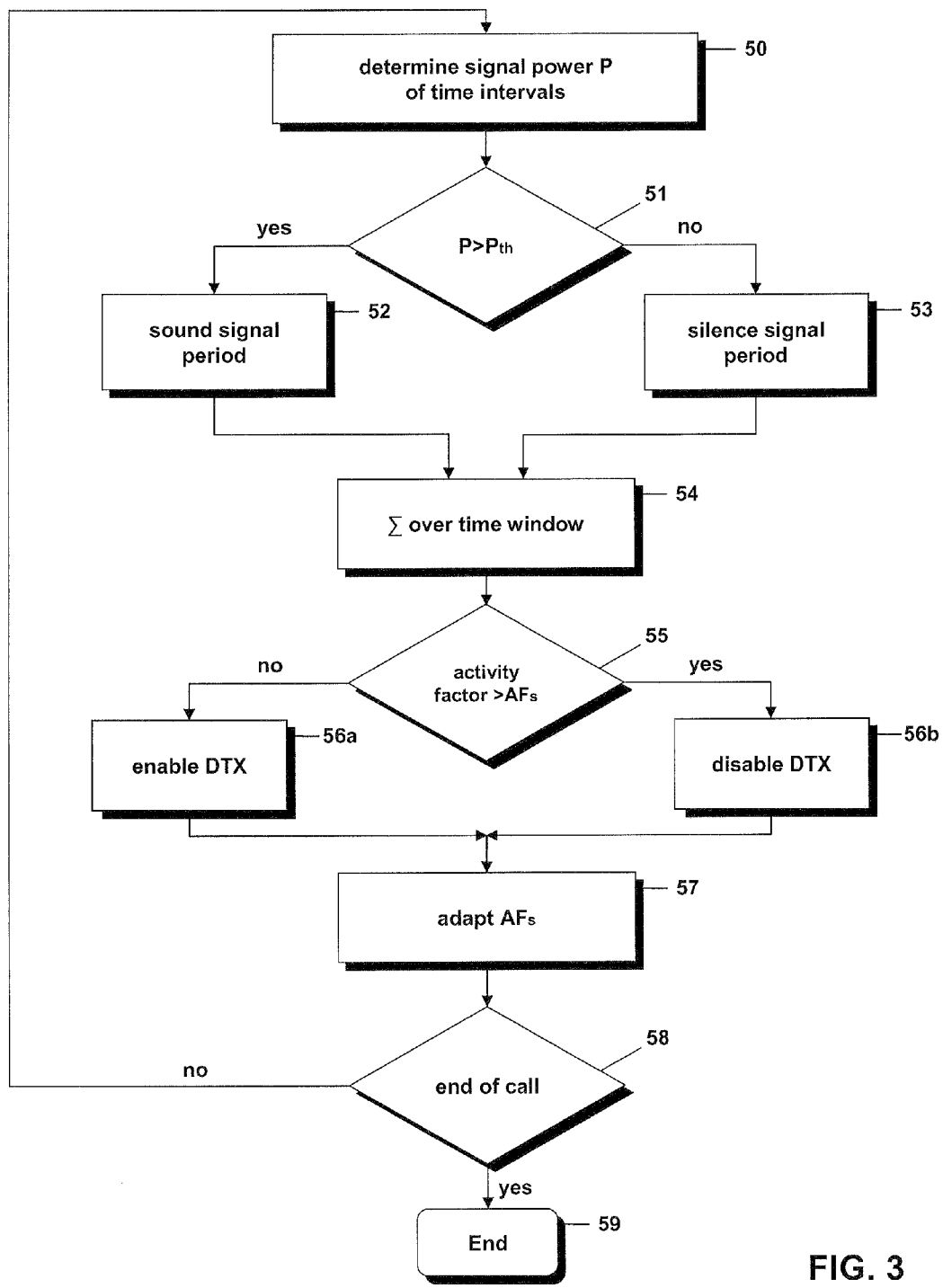
FIG. 3 shows a flow chart containing the steps for enabling or disabling DTX.

In FIG. 3 the steps for determining whether DTX should be disabled or enabled are summarized. In step 50 the activity detector may determine the signal power of the time interval, such as the PCM samples. The signal power over a frame, e.g.

Figure 4:
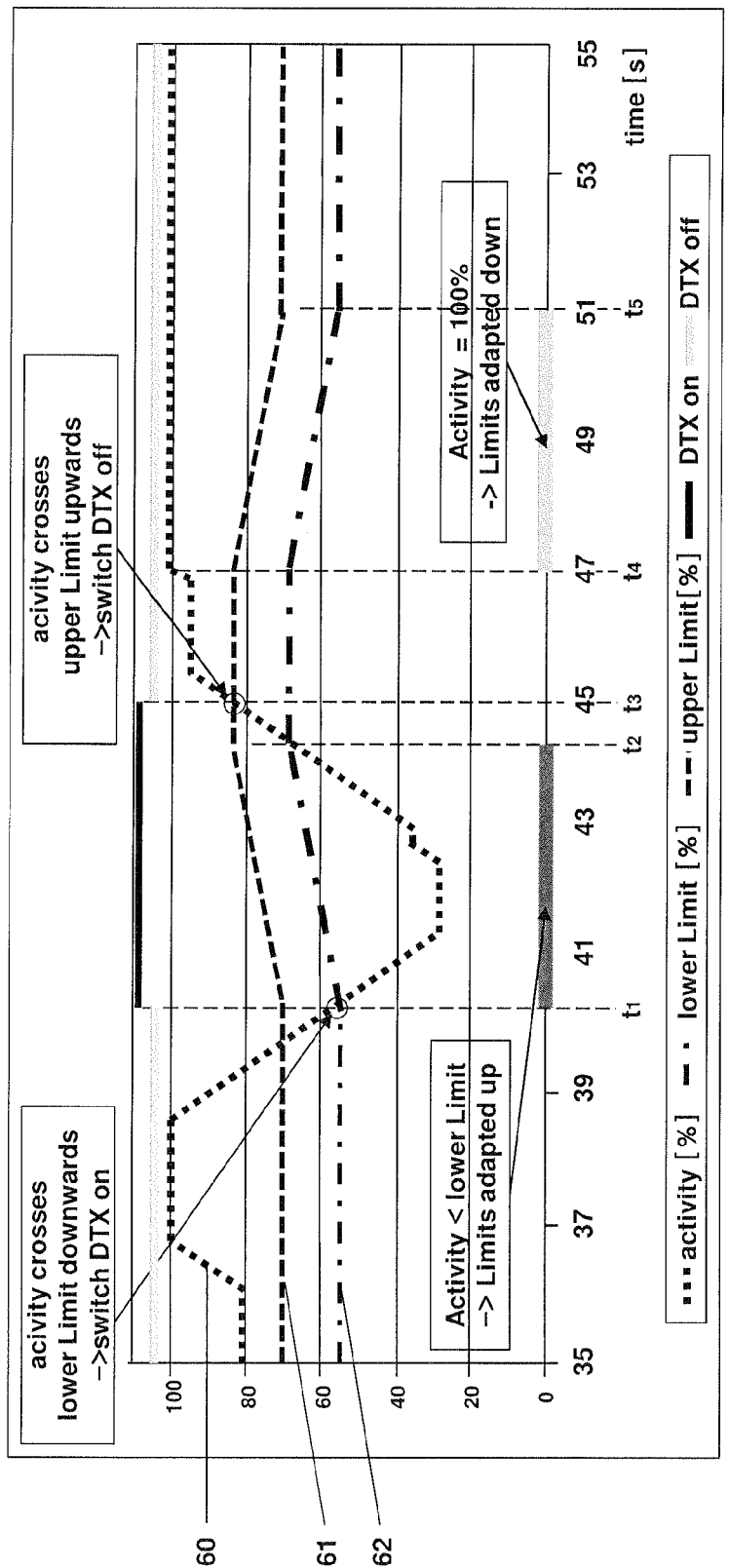
FIG. 4 shows the activation and deactivation of DTX in dependence on the adaptive activity factors.

20 ms, may be estimated as a sum of squares or alternatively as a sum of absolute values of the samples. In step 51 the signal power of each frame is analyzed and compared to a signal power threshold $P_{th}$ to determine whether the frame is representing a part of a sound signal period or a silence signal period. If the signal power is higher than the threshold $P_{th}$, then in step 52 the signal is considered as a sound signal period. If, however, the signal power is lower than the power threshold, the signal may be considered as a silence signal period in step 53. In step 54 the amount of sound signal periods and silence signal periods in a sliding time window are summarized. By way of example the sliding time window may contain 2-4 s or 100-200 samples. The activity factor then corresponds to the percentage of signal samples having a voice activity flag of high. Thus, in step 54 the voice activity factor is determined by the summation of the signal samples of the sliding time window. In step 55 it is then asked whether the activity factor is higher than this specified activity factor $AF_s$, e.g. higher than around 75-85%. If this is the case, it can be deduced that a music signal is present in the call and the DTX mode is disabled in step 56b. If, however, the activity factor is lower than the specified activity factor, the DTX mode may be enabled in step 56a. The threshold $AF_s$ in step 55 can be an activity factor threshold range including an upper threshold and a lower threshold, as can be seen from FIG. 4. Furthermore, the upper and the lower thresholds may be adaptive thresholds that are incremented or decremented in dependence on the determined activity factors. In FIG. 4. the determined activity factor 60 is shown over time. Additionally, the upper threshold 61 and the lower threshold 62 are indicated. During a first time period the activity factor is higher than the upper and the lower threshold. As a consequence, DTX is switched off. Then, at time t1 the activity factor crosses the lower activity threshold. As a consequence, it can be deduced that no music signal is present in the call any more and DTX is switched on at time t1. Then the activity factor starts to rise again, crossing the lower threshold at time t2. However, only after the activity factor is higher than the upper threshold 61 again, DTX is disabled again at time t3. As can be seen from FIG. 4, the thresholds are incremented if the activity factor is low enough e.g. in FIG. 4 lower than the lower threshold (between t1 and t2) and may be decremented within a certain range between t4 and t5 if the activity factor is high enough e.g. 100% in FIG. 4. This helps to avoid the frequent change between DTX on and off. Thus, the longer the DTX enabling or disabling unit enables or disables DTX, the harder is the change of the status.

Referring back to FIG. 3, and as discussed in connection with FIG. 4, the upper and the lower thresholds can be adapted in step 57. In the embodiment shown in FIG. 4 an upper and the lower threshold values are used. However, it is also possible to set the lower threshold to the upper threshold and to use only a single threshold.

In step 58 it is asked whether the call has ended. If not, it is continuously determined whether a music signal is present in the call, and if an end of a call was detected in step 58, the method ends in step 59.

Summarizing, the present invention allows to switch off DTX just for music. The present invention works for any music playing scenario, be it a music ring-back tone, a music waiting tone or a music on-hold service. The present invention is an autonomous solution in the user plane node and may be implemented in the media gateway without impact on the call control server nodes. Additionally, it is easy to deploy, since it does not require configuration effort on the call control layer. The invention may be used anywhere where a speech encoder is used.

The invention claimed is:

1. A system for controlling a discontinuous transmission mode of a speech encoder, the system comprising:
    the speech encoder comprising a speech encoder circuit configured to encode a call input signal and output an encoded call output signal;
    an activity detector circuit configured to determine a presence of sound signal periods in the call input signal relative to the presence of silence signal periods in the call input signal;
    a discontinuous transmission enabling/disabling circuit configured to:
        determine an activity factor based on the sound and silence signal periods in the call input signal;
        enable and disable the discontinuous transmission mode for the encoded call output signal;
    wherein the discontinuous transmission enabling/disabling circuit disables the discontinuous transmission mode if the determined activity factor is higher than a specified activity factor;
    wherein the discontinuous transmission enabling/disabling unit is configured to determine the activity factor by determining a relation of speech and music signal samples relative to silence signal samples in the call input signal.

2. The system of claim 1 wherein the discontinuous transmission enabling/disabling circuit is configured to use an information of a voice activity detector circuit configured to distinguish speech from speech pauses for determining the activity factor.

3. The system of claim 1 wherein the discontinuous transmission enabling/disabling circuit is configured to disable the discontinuous transmission mode if the activity factor is higher than 75%.

4. The system of claim 1 wherein the discontinuous transmission enabling/disabling circuit is configured to enable the discontinuous transmission mode again in response to the detected activity factor being lower than the specified activity factor.

5. The system of claim 1:
    wherein the activity detector circuit is configured to determine a value of a voice activity flag, the voice activity flag having a first value if a time interval of the call input signal is considered to be a sound signal period, the voice activity flag having a second value if the time interval of the call input signal is considered to be a silence signal period;
    wherein the discontinuous transmission enabling/disabling circuit is configured to determine as the activity factor the percentage of time intervals in a sliding time window containing the plurality of time intervals of the call input signal having the first value of the voice activity flag.

6. The system of claim 5:
    wherein the activity detector circuit is configured to determine the value of the voice activity flag by determining a signal power of the time interval of the call input signal;
    wherein the activity detector circuit is configured to compare the determined signal power to a power threshold;
    wherein, when the signal power is higher than the threshold, the activity detector circuit assigns the first value to the time interval and considers the time interval of the call input signal to be a sound signal period.

7. A method for controlling a discontinuous transmission mode of a speech encoder encoding a call input signal and outputting an encoded call output signal, the method comprising:
- determining a presence of sound signal components in the call input signal relative to the presence of silence signal components in the call input signal;
- determining an activity factor based on the amount of sound and silence signal components in the call input signal; wherein the determining comprises determining the relation of speech and music signal samples relative to silence signal samples in the call input signal;
- enabling or disabling the discontinuous transmission mode for the encoded call output signal based on the determined activity factor;
- wherein, if the determined activity factor is higher than a specified activity factor, the discontinuous transmission mode is disabled.

8. The method of claim 7:
- wherein the determining the activity factor comprises monitoring a voice activity detector configured to distinguish speech from speech pauses;
- wherein the discontinuous transmission mode is disabled when speech pauses determined by the voice activity detector are below a threshold.

9. The method of claim 7 wherein the discontinuous transmission mode is disabled if the activity factor is higher than 75%.

10. The method of claim 7:
- wherein the discontinuous transmission mode is disabled in an alerting phase of a call;
- further comprising enabling the discontinuous transmission mode again in response to the determined activity factor during the alerting phase of the call is lower than the specified activity factor.

11. The method of claim 7:
- wherein the specified activity factor is an activity factor range with an upper threshold and a lower threshold;
- wherein if the activity factor is higher than the upper threshold, the discontinuous transmission mode is disabled;
- wherein the discontinuous transmission mode is enabled if the activity factor is lower than the lower threshold.

12. The method of claim 11:
- wherein the upper and the lower thresholds are adaptive thresholds;
- wherein the upper and lower thresholds are incremented when the activity factor is lower than the lower threshold;
- wherein the upper and lower thresholds are decremented if the activity factor is higher than the upper threshold.

13. The method of claim 7:
- wherein the activity factor is determined by determining a value of a voice activity flag, the voice activity flag having a first value if a time interval of the call input signal is considered to be a sound signal period, the voice activity flag having a second value if a time interval of the call input is considered to be a silence signal period;
- wherein the activity factor is the percentage of time intervals in a sliding time window containing the plurality of time intervals of the call input signal having the first value.

14. The method of claim 13:
- wherein determining the value of the voice activity flag comprises determining a signal power of the time interval of the call input signal;
- wherein the determined signal power is compared to a threshold;
- wherein, when the signal power is higher than the threshold, the first value is assigned to the time interval and the time interval of the call input signal is considered to be a sound signal period.

15. A discontinuous transmission enabling/disabling circuit for controlling a discontinuous transmission mode of a speech encoder, the circuit configured to:
- receive an output of an activity detector indicating, for each of multiple samples of a call input to the activity detector, which samples contain sound and which samples contain a pause in sound, wherein the output of the activity detector does not discriminate between speech and music;
- determine, based on the output of the activity detector, an activity factor representing how many of the samples are indicated as containing sound relative to how many of the samples are indicated as containing a pause in sound; and
- disable discontinuous transmission mode of the speech encoder for periods of the call comprising music, by disabling discontinuous mode when the determined activity factor meets or exceeds a threshold.

16. The discontinuous transmission enabling/disabling circuit of claim 15:
- wherein the output of the activity detector is a flag having a first value if a sample contains sound and a second value if a sample contains a pause in sound;
- wherein the activity factor is a ratio of (i) the samples in a sliding window that have the first value; to (ii) the samples in the sliding window that have the second value.

17. The discontinuous transmission enabling/disabling circuit of claim 16, wherein the flag has the first value if a signal power of a sample is higher than a power threshold and has the second value if the signal power of the sample is lower than the power threshold.

18. The discontinuous transmission enabling/disabling circuit of claim 15, configured to disable the discontinuous transmission mode when the activity factor is higher than 75%.

19. A method implemented by a discontinuous transmission circuit for controlling a discontinuous transmission mode of a speech encoder, the method comprising:
- receiving an output of an activity detector indicating, for each of multiple samples of a call input to the activity detector, which samples contain sound and which samples contain a pause in sound, wherein the output of the activity detector does not discriminate between speech and music;
- determining, based on the output of the activity detector, an activity factor representing how many of the samples are indicated as containing sound relative to how many of the samples are indicated as containing a pause in sound; and
- disabling discontinuous transmission mode of the speech encoder for periods of the call comprising music, by disabling discontinuous mode when the determined activity factor meets or exceeds a threshold.

20. The method of claim 19:
- wherein the output of the activity detector is a flag having a first value if a sample contains sound and a second value if a sample contains a pause in sound;

wherein the activity factor is a ratio of (i) the samples in a sliding window that have the first value; to (ii) the samples in the sliding window that have the second value.

21. The method of claim 20, wherein the flag has the first value if a signal power of a sample is higher than a power threshold and has the second value if the signal power of the sample is lower than the power threshold.

22. The method of claim 19, wherein disabling discontinuous transmission mode comprising disabling the discontinuous transmission mode when the activity factor is higher than 75%.

\* \* \* \* \*